United States Patent [19]
Johnson

[11] Patent Number: 6,027,638
[45] Date of Patent: Feb. 22, 2000

[54] AUTOMATIC FILTRATION AND EXTRACTION DEVICE AND METHOD

[76] Inventor: Robert S. Johnson, 25 Blue Heron Ave., Hampstead, N.H. 03841

[21] Appl. No.: 09/075,552

[22] Filed: May 11, 1998

Related U.S. Application Data

[62] Continuation-in-part of application No. 08/979,202, Nov. 26, 1997, abandoned, which is a continuation of application No. 08/522,237, filed as application No. PCT/US94/02163, Mar. 1, 1994, Pat. No. 5,753,105, which is a continuation-in-part of application No. 08/025,663, Mar. 3, 1993, abandoned.

[51] Int. Cl.⁷ ............................. B01D 17/12; B01D 11/00
[52] U.S. Cl. ........................ 210/86; 73/863.23; 210/97; 210/141; 210/406; 210/511; 422/69; 422/101; 422/103; 422/106
[58] Field of Search ................ 210/86, 97, 110, 210/141, 143, 232, 406, 416.1, 445, 455, 456, 511; 422/62, 63, 68.1, 69, 101, 102, 103, 106, 116; 73/863.23, 863.24, 863.25

[56] References Cited

U.S. PATENT DOCUMENTS

| | | | |
|---|---|---|---|
| 2,091,810 | 8/1937 | Ferraez, Jr. | 73/863.23 |
| 4,247,399 | 1/1981 | Pitesky | 210/406 |
| 4,598,049 | 7/1986 | Zelinka et al. | 422/62 |
| 4,649,028 | 3/1987 | Kaltenbach et al. | 422/63 |
| 4,701,304 | 10/1987 | Horn et al. | 422/62 |
| 4,783,318 | 11/1988 | Lapakko | 422/101 |
| 4,835,707 | 5/1989 | Amano et al. | 73/863.25 |
| 4,890,484 | 1/1990 | Telfer et al. | 73/61 |
| 5,190,666 | 3/1993 | Bisconte | 422/106 |
| 5,240,680 | 8/1993 | Zuckermann et al. | 422/67 |

FOREIGN PATENT DOCUMENTS

| | | |
|---|---|---|
| 3922333 A1 | 1/1991 | Germany . |
| 4112239 C1 | 7/1992 | Germany . |

*Primary Examiner*—Joseph W. Drodge
*Attorney, Agent, or Firm*—Hamilton, Brook, Smith & Reynolds, P.C.

[57] ABSTRACT

An improved automatic filtration and extraction device is disclosed which comprises a base defining at a top end a cavity area which tapers downwardly and inwardly from the top end to define a chamber for a portion and then defines a plurality of effluent outlets at the bottom end each extending from the chamber to an outer surface of the body. Seals are adapted to each of the effluent outlets and are moveable between a first closed position sealing the effluent outlet and a second open position to allow the passage of effluent through the effluent outlet. A filter is detachably and removably adapted over the cavity area. Various solvents are provided to the cavity area through a solvent provider. A circuit with programmable memory accesses and directs a sequence of events after an initial event. A vacuum connected to each of the effluent outlets each induces effluent flow through an effluent outlet while sealing all other outlets. A removable valve assembly attaches to the sample bottle such that the bottle and valve assembly may be removed as a single unit from the base. An extraction sequence may be manually interrupted for removal of the sample bottle to another station.

9 Claims, 9 Drawing Sheets

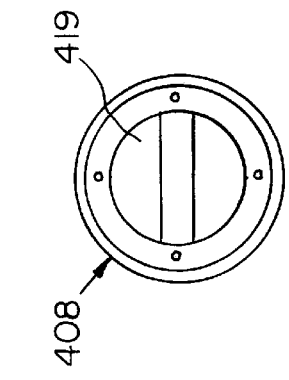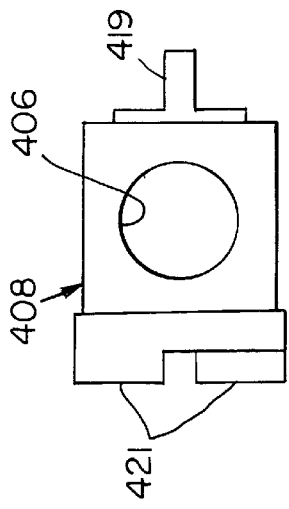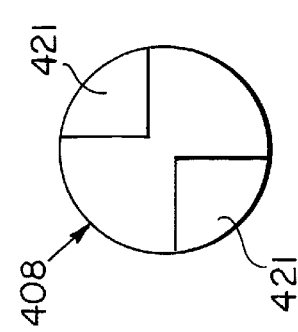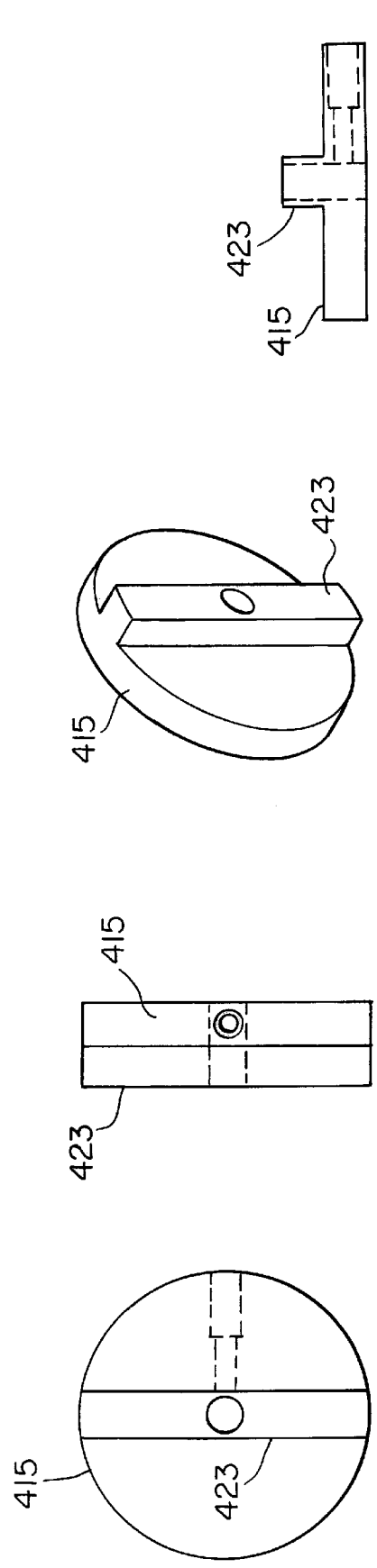

AUTOMATIC FILTRATION AND EXTRACTION DEVICE AND METHOD

RELATED APPLICATIONS

This application is a Continuation-in-Part of U.S. Ser. No. 08/979,202, filed Nov. 26, 1997, now abandoned, which is a Continuation of U.S. Ser. No. 08/522,237, filed Nov. 5, 1995, now U.S. Pat. No. 5,753,105, which is a 371 of Application PCT/US94/02163, filed Mar. 1, 1994, which is a Continuation-in-Part of U.S. Ser. No. 08/025,663, filed Mar. 3, 1993, now abandoned, the entire teachings of each of these applications being incorporated herein by reference.

BACKGROUND OF THE INVENTION

Increasing interest, including concern for the environment, has lead to more and more quality control of air and water.

Analytical methods used by laboratories to analyze aqueous samples for organic components, require laboratory personnel to follow very specific and time consuming operations. As more samples need to be analyzed, laboratories are looking for new ways to handle the increased sample load, and at the same time, to provide accurate and reproducible data.

To aid in this endeavor, recent methodology improvements by the US EPA have introduced a filtration procedure, whereby organics are chemically removed from the water sample. The water sample is passed through a filter media which contains a chemical adsorbent. Once the water sample has passed through the filter, the filter is extracted with an organic solvent. This solvent is collected and later analyzed.

A number of problems are associated with this filtration procedure. First, in order to ensure the filter media is properly conditioned, the filter must be washed and soaked with organic solvents, in a proper sequence, in order to change the polarity of the filter media. As the filter media is being conditioned, it is critical that the surface of the filter media not be exposed to air. Once the water sample has been filtered, the filter media must be carefully soaked and eluted to ensure adequate recovery of the organics of interest. These time critical, and time consuming steps, make consistent and reproducible recoveries difficult to achieve.

There exists a great need for precise automated devices and methods for sample analysis.

SUMMARY OF THE INVENTION

I have discovered an improved automatic filtration and extraction device which comprises a base means defining at a top end thereof a substantially broadened cavity area, tapering downwardly and inwardly from said top end thereof to further define a chamber means for a portion thereof and then further defining a plurality of effluent outlet means at a bottom end thereof, each extending from said chamber means to an outer surface of said body means. A plurality of sealing means are adapted to each of said outlet means. Each is moveable between a first closed position sealing said outlet means and a second open position allowing the passage of effluent. A filter means detachably and removably adapts over said substantially broadened cavity area. Solvent providing means are adapted to said housing means whereby various solvents are provided to said substantially broadened cavity area. Programmable memory means are connected to the housing means and provide a series of events. Circuit means comprise the programmable memory means to access and direct a sequence of events after an initial event. Vacuum means are adapted to each of said effluent outlet means, each vacuum means having an "ON" position whereby vacuum is provided to induce effluent flow through said effluent outlet means and to seal off the other effluent outlet means, preventing "backflow", and an "OFF" position eliminating vacuum.

My method for improved automatic filtration and extraction comprises the steps of placing a filter, specifically designed for a specific adsorbate, in the extraction device. The filter is then washed with a cleansing solvent. The sample is then filtered with the desired chemicals adsorbed in the filter. The test sample is then extracted from the filter by a preferred solvent and deposited in a sample tube.

Preferably but optionally my improved automatic filtration and extraction device includes a directed flow solvent dispensing ring so that the introduction of solvent may be made in as uniform a manner as possible to thoroughly wash down the internal walls of my device.

Preferably but optionally the filter means in my improved extraction device includes a filter of the type in which a desired adsorbate is specifically adsorbed and then extracted. More particularly, these filters such as 3M's EMPORE® filter can be made for specific adsorption of various organics in drinking water.

Preferably, but optionally, all the active surfaces, including the balls in the outlet sealing means, of my improved automatic filtration and extraction device are made from an inert material, more particularly a thermoplastic, and particularly a chlorinated fluorocarbon polymer, particularly Teflon®.

Preferably, but optionally, my improved extraction device includes a fluid sample sensor so that as the sample is introduced there is always sufficient sample to keep the filter wet. In the preferred embodiment a pair of thermistors are placed one above the other to maintain a predetermined level.

Preferably my "chamber means" is made as small as practicable to keep "dead volume" in the chamber to a minimum so that as little cross-contamination as possible will occur. All aspects of the chamber are scrutinized scrupulously to minimize any cross-contamination or "back flow" contamination. Various materials including Teflon have been studied to form a seal, and ruby and sapphire were selected.

Preferably, but optionally, the end of each effluent outlet means adjacent the "chamber means" has an annular collar in which the ball of the sealing mechanism seats to maximize sealing of that effluent outlet means.

My invention provides numerous advantages over those devices found in the prior art.

It is an advantage of my improved automatic extraction and filtration device that samples can be processed rapidly and yet very accurately. The device provides for directed liquid flow of any solvent introduction, therefore making each extraction more uniform.

My invention also provides minimization of cross contaminatability by solvents and extraction products.

Other advantages of my improved extraction device are that it is strong and durable, simple to manufacture, efficient and economical.

Preferably, the improved automatic filtration and extraction device comprises a valve assembly arranged above the filter means such that in a first orientation, sample flows through the valve assembly and onto the filter means. When the valve is in a second orientation, sample cannot flow through. The valve assembly attaches to a sample container such that the valve assembly and sample container may be installed and removed as a unit from the base without loss of sample. Preferably, the value assembly comprises a valve core which is controlled by an actuator which rotates 180°. A drive disk converts the 180° of rotation from the actuator into 90° of rotation of the valve core. Preferably, the valve core comprises a hand-controllable knob for manually turning the valve core 90°. Preferably a solvent wash means is connected to the solvent providing means to spray solvent through the valve assembly into the sample container wherein the inside surface of the sample container can be washed down between samples.

These and other advantages of my invention will become apparent when viewed in light of the accompanying drawings and following detailed description.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8A is a view of the actuator-controlled end of the valve core of the embodiment of FIGS. 7A and 7B.

FIG. 8B is a top view of the valve core.

FIG. 8C is a view of the hand-controlled end of the valve core.

FIGS. 9A–9D are front, side, isometric and alternate side views of the drive disk of the embodiment of FIGS. 7A and 7B.

DETAILED DESCRIPTION OF THE INVENTION

Figure 1:
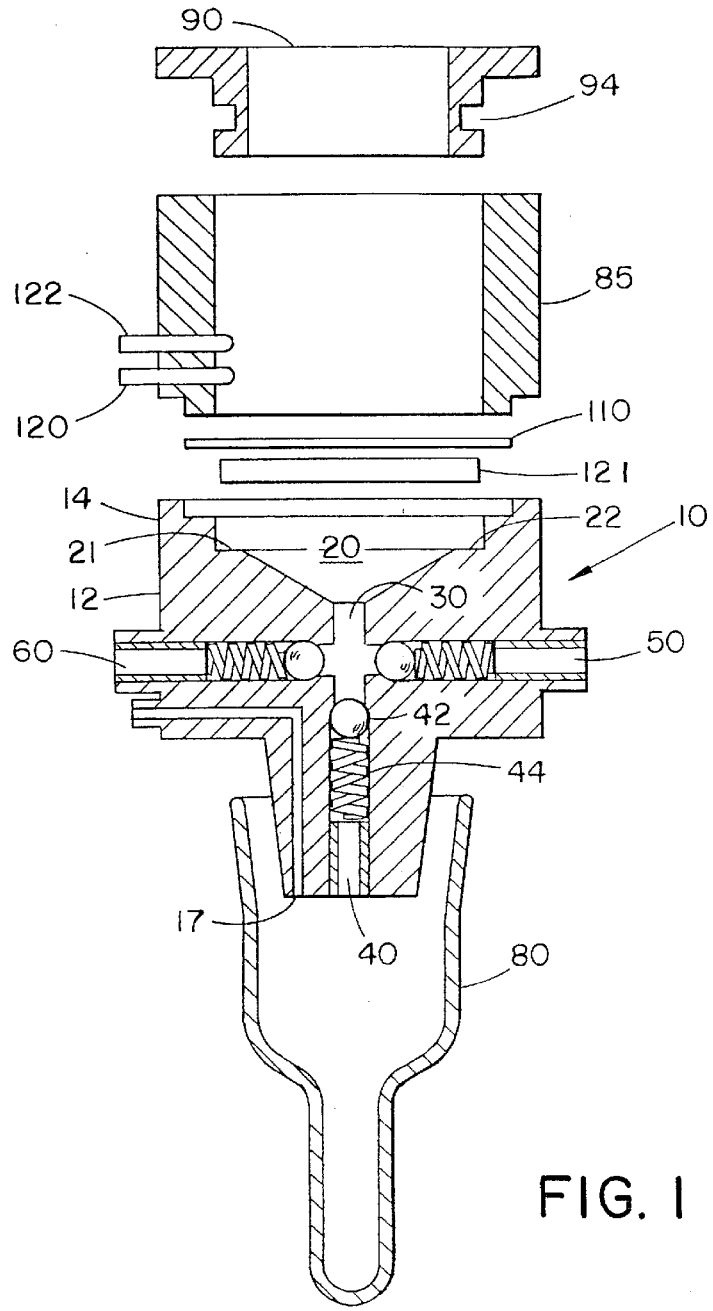
FIG. 1 is a cut-away front view of my improved automatic filtration and extraction device.

Referring now in particular to the accompanying drawings, my improved automatic filtration and extraction device is generally indicated at 10 in FIG. 1 and includes base 12. Broadened cavity area 20 tapers downwardly to chamber 30 which extends downwardly to effluent outlets 40, 50, 60 each of which has a ball closure 42 and retaining ball seat and spring 44. Effluent outlet 40 extends to the end of the base 12. Detachable collector vessel 80 fits over the end of base 12, forming an airtight seal. Vent 17 is a vacuum pathway to the detachable collection vessel, used to control ball closure 42.

Figure 2:
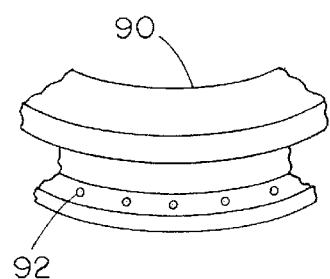
FIG. 2 is an isometric view of a segment of the solvent dispensing ring of FIG. 1.

Collar 85 fits into the base and contains thermistors 120, 122 the ends of which extend out onto the cavity area. Directed flow solvent dispensing ring 90 (FIG. 2) fits over the collar 85 and includes apertures 92 (FIG. 2). Flow channel 94 extends around the directed flow solvent dispensing ring and includes a connecting passage (not shown).

A solvent dispenser (not shown) is connected to a series of solvent reservoirs (not shown) and to the directed flow solvent dispensing ring 90.

FIG. 1 depicts filter 110 positioned on filter screen support 121 which fits into slots 21, 22 of broadened cavity area 20. Thermistors 120, 122 are situated in the collar 85, slightly above the filter surface to control the level of liquid. As the level of liquid rises above the first thermistor 120, it activates that thermistor and as the liquid level rises past the second thermistor 122, the liquid level activates that thermistor, so that whenever the liquid level falls below the second thermistor, more sample is provided. Vacuum 140, 150, 160 (FIG. 3) is connected to each effluent outlet 40, 50, 60 to assist withdrawal of effluent. Microprocessor 210 actuates the solvent dispenser and thermistor control and controls the opening and shutting of the ball closure in each effluent outlet by opening and closing electronic solenoid valves.

Figure 3:
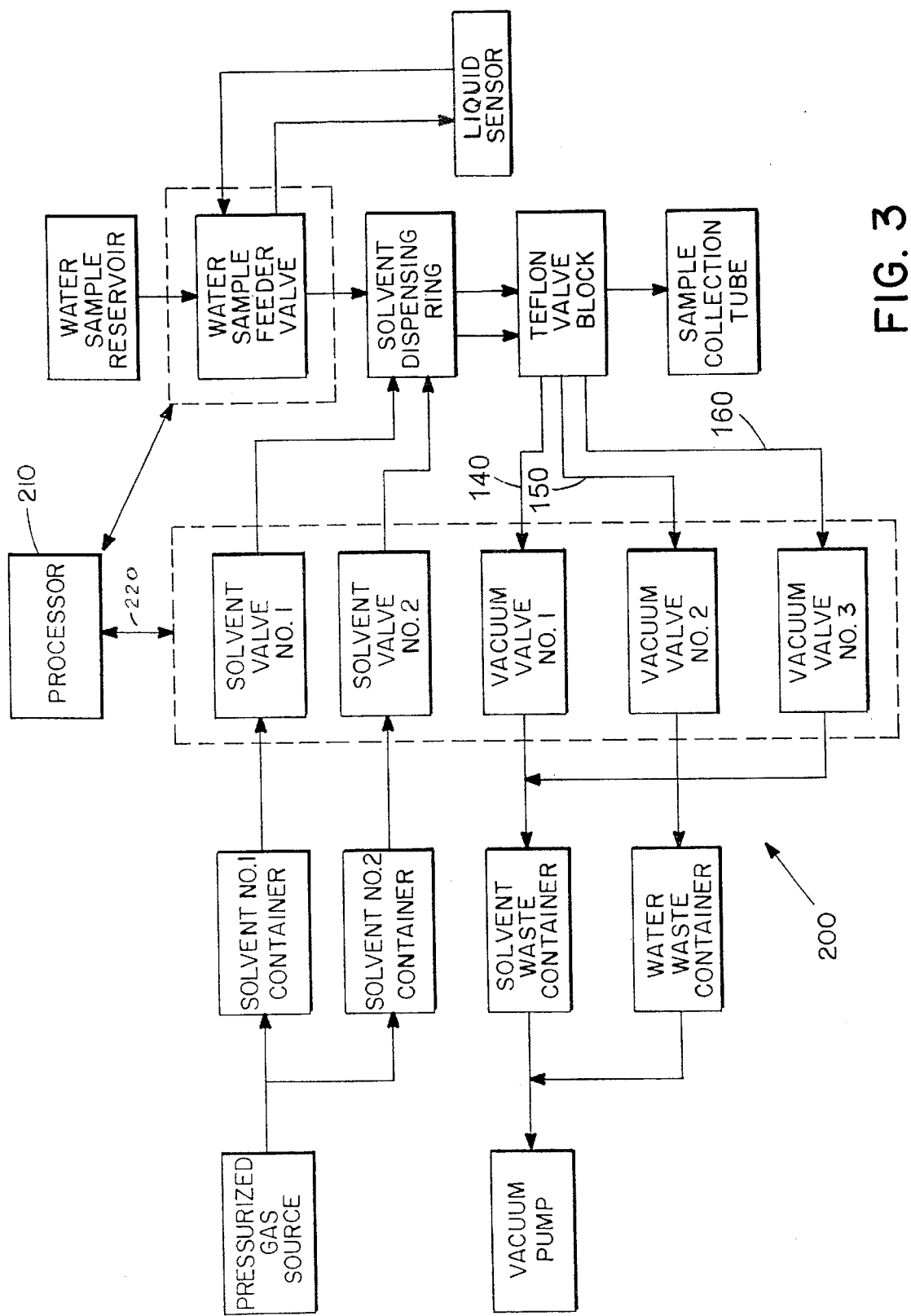
FIG. 3 is an overall schematic.

FIG. 3 details a schematic of the improved filtration and extraction device or "station" 200 which is connected to a central "controller" 210 which controls one or more "stations". The controller 210 is interfaced to each station 200 using an eight-conductor cable 220. There is one microprocessor for the controller and one microprocessor in each station.

The cable contains communication from the microprocessor in the controller to each station. It also contains the power needed to run the valves and microprocessor in the station. Each station contains a microprocessor, valves and relays to control the station. Commands are sent from the controller to each active station. These commands are processed locally by the microprocessor in each station. The microprocessor uses the command information to change the state of the valves. The controller has external ROM memory for firmware program storage. It uses the 128 byte internal memory of the microprocessor for all other activities. The valves in each station are controlled by a solid state relay.

Figure 4:
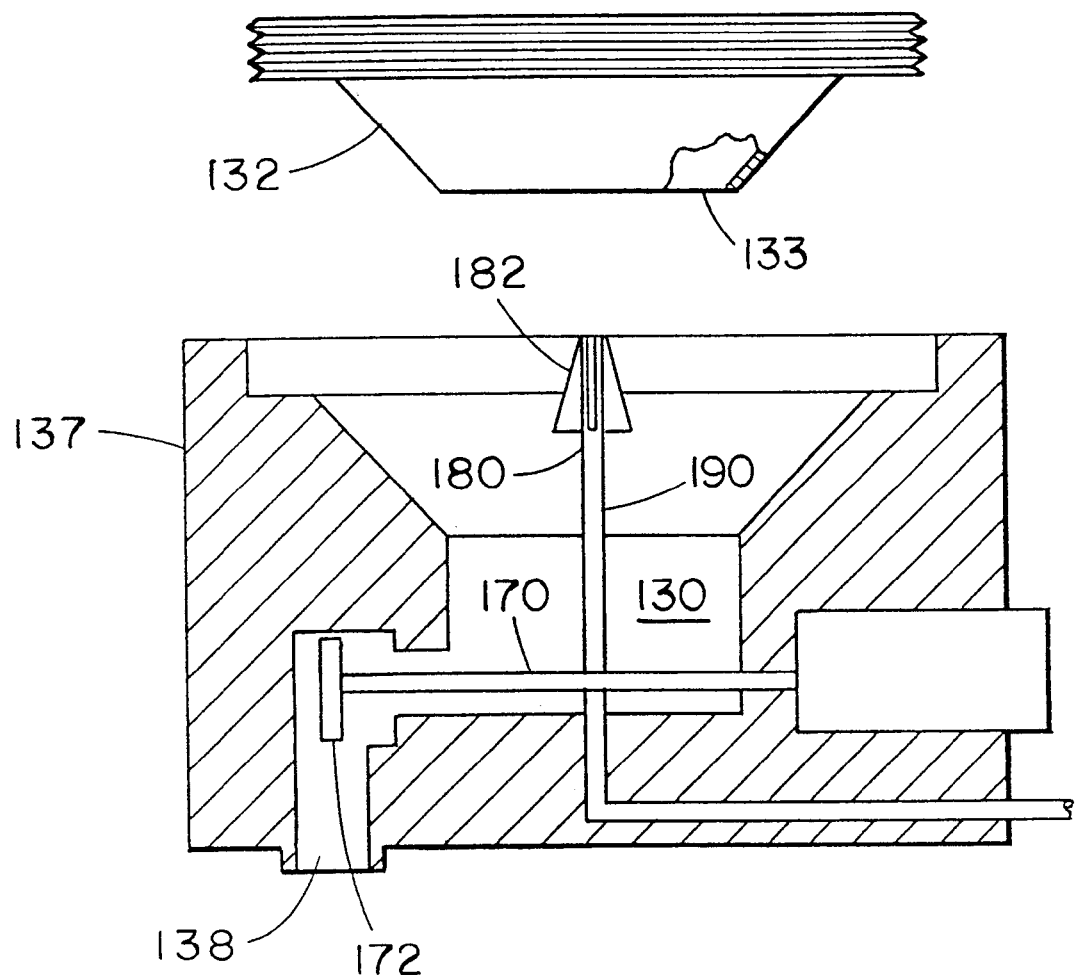
FIG. 4 is a cut-away side view of the sample dispenser and sample bottle cap.

FIG. 4 depicts reservoir 130 of my improved automatic filtration and extraction device. Water samples are collected in bottles (not shown). The top of a water sample bottle is removed. A pierceable-foil material is put in place over the top of the sample bottle and screw top 132 having opening 133 is screwed onto the top of the sample bottle. The sample bottle is inverted and put into place over the sample provider 137 and lowered onto piercing barb 180, piercing the foil material and allowing the sample to flow into the sample provider. Random spray solvent washer tube 190 includes spray holes (not shown) in piercing barb 180 which has fins 182. Piston 170 includes a flange end 172 which closes and opens sample port 138. When directed to provide water by thermistor 122 the piston retracts from the port and water flows onto the filter.

In operation the filter is positioned on the filter screen support. The system is actuated and solvent is automatically dispensed from apertures in the directed flow solvent dispensing ring 90, rinsing the filter and the broadened cavity area. This solvent is then evacuated through chamber 30 and effluent outlet 50 (although the embodiment can be programmed to utilize any effluent outlet).

At the end of this rinsing, effluent outlet 50 closes automatically and a test sample is dispensed onto the filter from the reservoir. When the sample bottle 131 is empty, solvent is sprayed within the sample bottle from the top of the piercing barb ensuring maximum collection of sample.

Water samples are collected in bottles which have a destructible foil closure in the top. The foil is placed on the bottle by the operator, so it can be loaded onto the unit. The water bottle is inverted and the foil seal is torn by the piercing barb as the bottle cap is set into place on the top of the reservoir. The water flows into the reservoir where it is held until the higher thermistor signals that more water is required on the filter. The piston 170 upon a signal by the thermistor opens the flange end reservoir gate 172 and water flows onto the filter until the thermistor signals shut off or the water sample is exhausted.

The liquid level of the sample remains sufficient to keep the filter wet.

A second effluent outlet 60 is opened and the water is evacuated through it. The water sample is then filtered and the organics adsorbed onto the filter. This second effluent outlet 60 is then closed and the extracting solvent is introduced taking the adsorbed sample from the filter through effluent outlet 40 into the detachable collection tube. The detachable collection tube is removed, another inserted in it place and the cycle repeats for the next sample.

Figure 6:
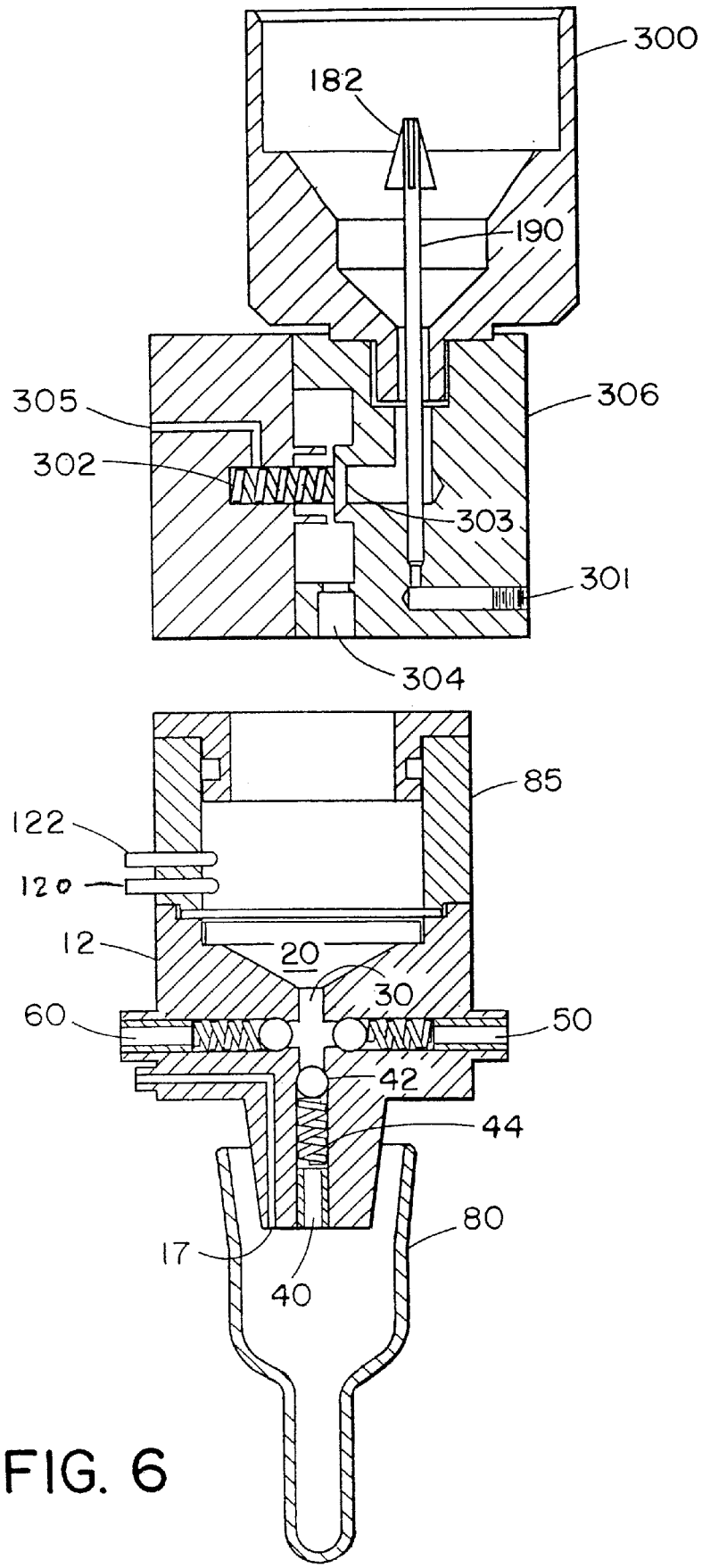
FIG. 6 is a cross-sectional view of a modified sample dispenser over the filtration and extraction device of FIG. 1.

A modified sample-providing means positioned over the filtration and extraction device of FIG. 1 is shown in FIG. 6. Once the water bottle is placed into the bottle holder 300, the piercing barb 182 pierces the foil material, allowing the water sample to drain into the water valve body 306. At the proper time during the sequence, a vacuum valve opens which pulls a vacuum through the vacuum port fitting 305. The vacuum pulls against spring 302, pulling the plunger 303 off the seat. This allows the water sample to drain down into the cavity area 20 which then fills up. When the water level reaches the top liquid sensor 122, the vacuum valve closes, causing the spring 302 to force the plunger 303 closed, and stopping the water flow. The water sample is removed from the cavity area by flowing out the port.

When the water level reaches the lower fluid level sensor 120, the vacuum valve opens, pulling the plunger 303 off the seat, allowing the water sample to drain into the cavity area. When the water level reaches the top liquid sensor, the plunger closes, stopping the flow of water. This sequence is repeated until all of the water has been removed.

Figure 5:
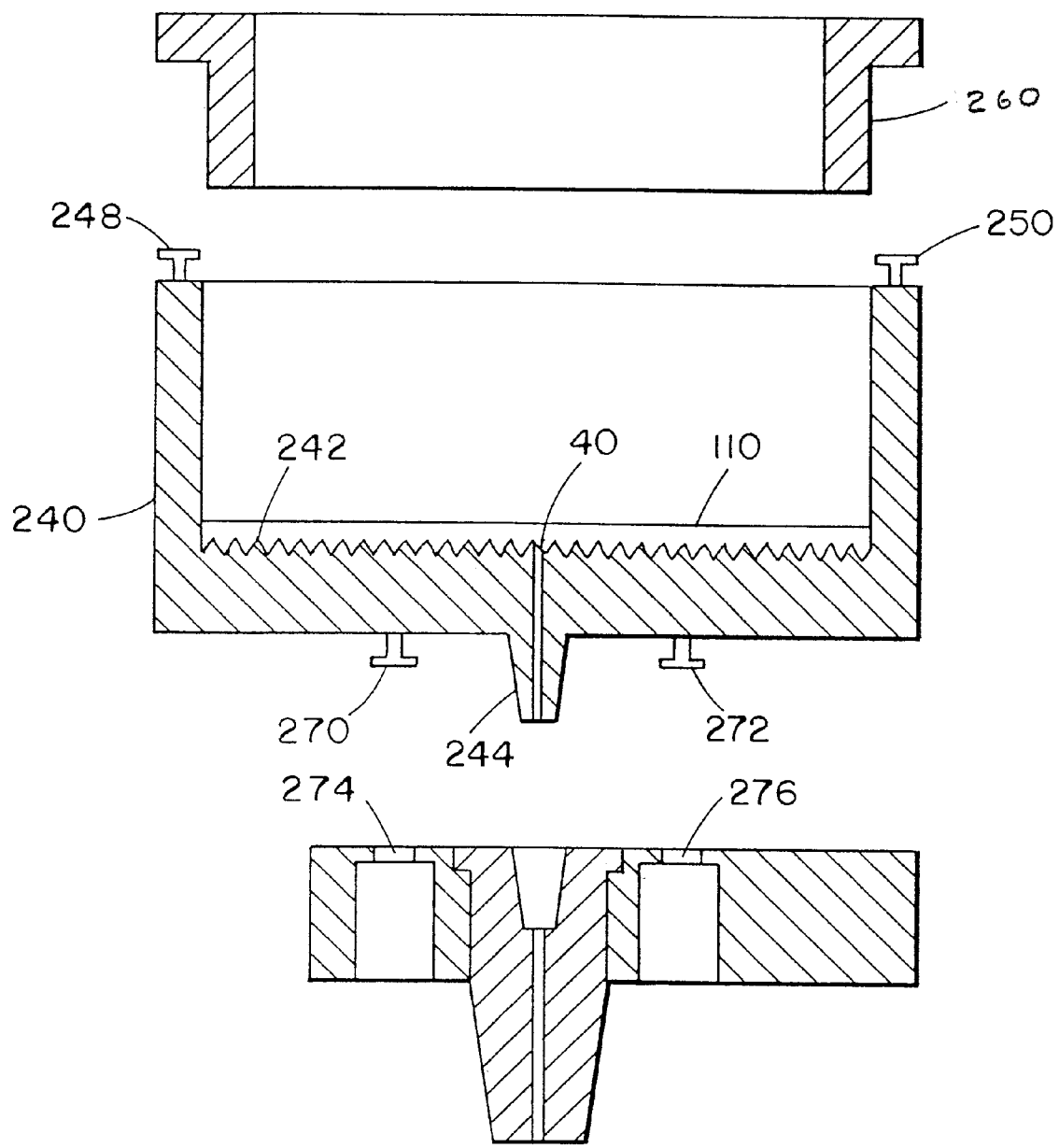
FIG. 5 is a cut away side view of an alternative embodiment of the filter module.

FIG. 5 depicts an alternative embodiment of the filter area. Filter module 240 includes saw toothed filter bed 242, cavity adapter section 244 and fastener brackets 248, 250 which retain filter ring 260 in place. Extending radially outward from the outlet 40 to the perimeter of the saw-toothed bed are collection channels 265 (not shown) to facilitate sample collection. Fastening pins 270, 272 detachably connect the filter module to corresponding fastener recesses 274, 276 on the base.

This alternative embodiment permits the filter to be changed or detached for analysis from the invention with minimal possible contamination.

The embodiment of the sample-providing means shown in FIGS. 7A–10 is particularly well-suited for samples such as polluted ocean water, which may contain solids that can clog other embodiments. If such clogging occurs, an on-going test must be aborted and the unit disassembled for cleaning.

This embodiment allows the manual interruption of a test before completion without aborting the test, and the removal of the sample to another device for completion. Processing of the sample extracted thus far is completed, after which the clogged device can be cleaned. Furthermore, the device does not need to be disassembled for cleaning.

Finally, this embodiment does not require piercing of any foil over the sample bottle, such as "battleship foil" which is difficult to pierce but is often used. By using a bottle cap adapter which press fits into the valve body, the need for foil is obviated.

Figure 7A:
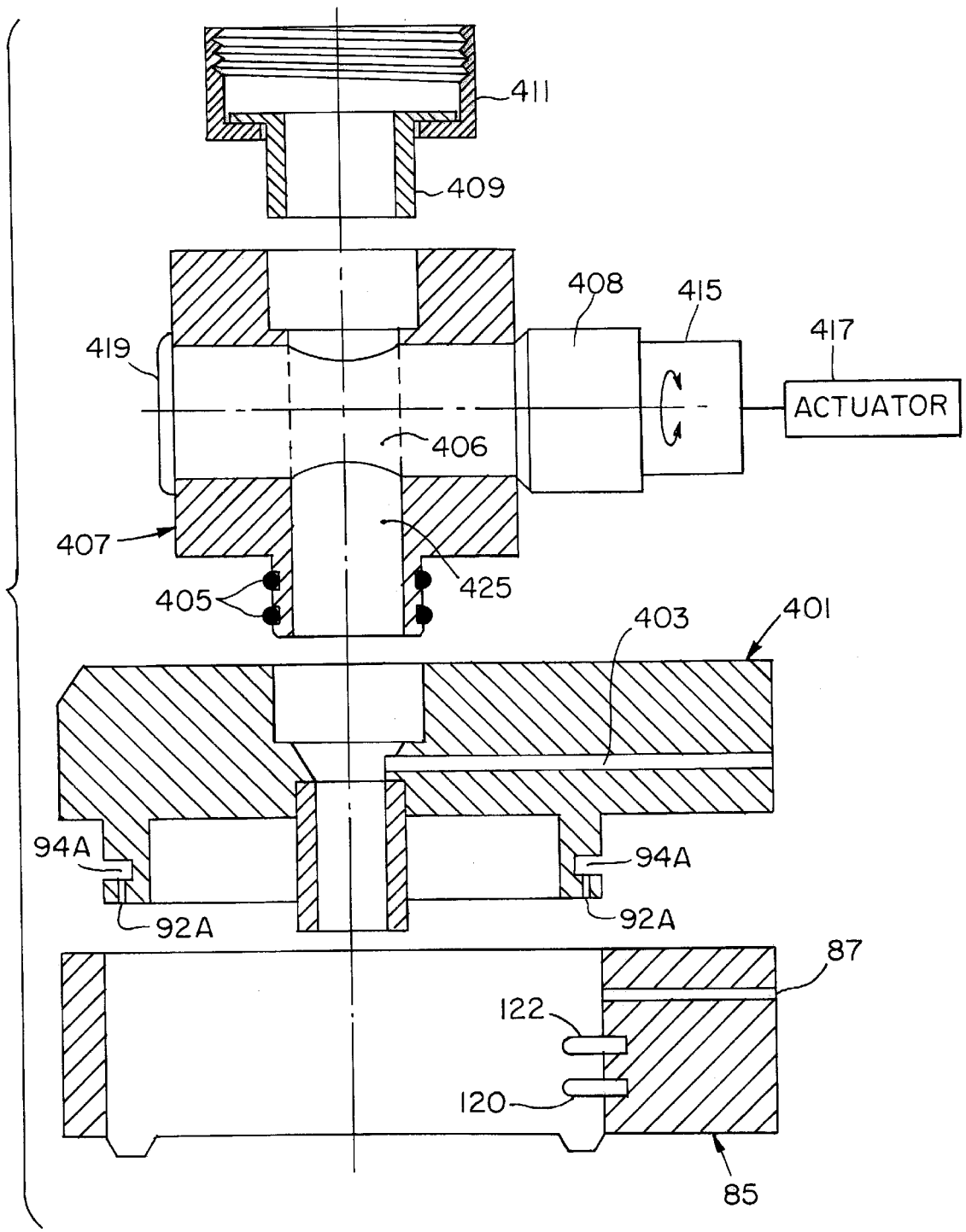
FIG. 7A is a cut-away view of a removable valve embodiment.

FIG. 7A is a cut-away view of this embodiment. Solvent ring 401 presses into collar 85. When the solvent ring 401 is properly seated in collar 85, pre-wet channel 87 allows solvent to be introduced into flow channel 94A, which disperses the solvent through small apertures 92A. Solvent wash tube 403 is built into the solvent ring 401.

The valve body 407 and valve core 408 make up the valve assembly. The valve body 407 fits into the solvent ring 401. O-rings 405 provide a seal. The valve core 408 fits inside the valve body 407 and rotates such that in one orientation (either of two positions 180° apart), the valve core hole 406 is aligned so that sample passes freely from a sample bottle or container (413 of FIG. 7B) through the valve, the solvent ring 401 and collar 85 and onto the filter 110. At a second orientation, the valve, is completely closed so that no liquid passes through.

Figure 7B:
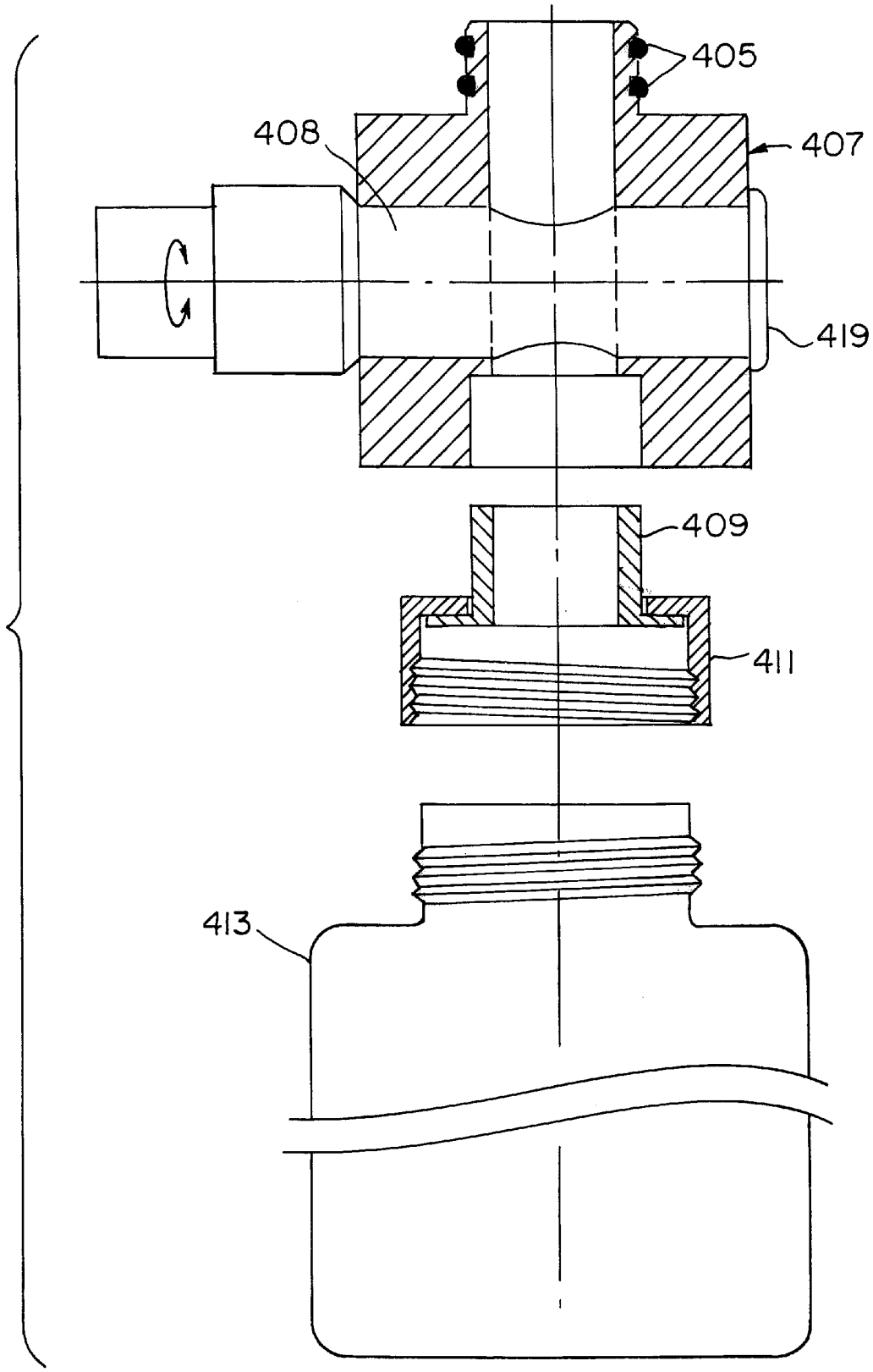
FIG. 7B is a cut-away of the cap adapter and valve as they are attached to a bottle.

FIG. 7B demonstrates how the valve is installed on a sample bottle 413. First, the cap adapter 409, 411 is screwed onto the bottle. Next, the valve 407, 408 is placed over the cap adapter, forming a tight press-fit seal. The valve core is placed in a closed position by hand-turning knob 419 to a closed position. Now the entire bottle/valve assembly can be turned over and inserted into the solvent ring 401 in the position shown in FIG. 7A. In the event of a clog, the valve can be hand-shut. As the fluid level falls, sensor 120 detects that no more sample is available, and the solvent wash phase begins, after which the bottle/valve assembly is easily removed to another device without losing any sample.

During normal operation, a pneumatically driven actuator 417 is attached to a drive disk 415 which rotates 180°. Due to the nature of the drive disk 415, described below, the valve core 408 only turns 90°, opening fully and allowing sample to pass and/or solvent wash to pass from cannular solvent tube 403 directly into the bottle.

FIG. 8A is a view of the actuator-controlled end of the valve core which is explained in conjunction with the drive disk below. FIG. 8B is a top view of the valve core looking through the hole 406. FIG. 8C is a view of the hand-controlled knob 419 of the valve core.

FIGS. 9A–9D are front, side, isometric and another side views of the drive disk 415. The drive disk is driven 180° by the actuator 417 to either open or close the valve. The valve core has two lobes 421 at its actuator-driven end, as shown in FIGS. 8A and 8B. The drive disk 415 has a bar 423 across its face which makes contact with the valve core lobes 421. The actuator causes the drive disk 415 to turn 180° in one direction to open the valve, and 180° in the opposite direction to close the valve. For the first 90° of drive disk rotation, there is no interaction between the drive disk and the valve core lobes, so the valve core does not turn. During the second 90° of drive disk rotation, bar 423 contacts valve core lobes 421, forcing the valve core to rotate 90° to the alternate position. This mechanism allows manual control of the valve without disturbing the actuator. If clogging occurs, a user manually rotates the valve to a closed position and removes the sample bottle along with the valve assembly. The extraction is not aborted and the actuator need not be activated.

Figure 10:
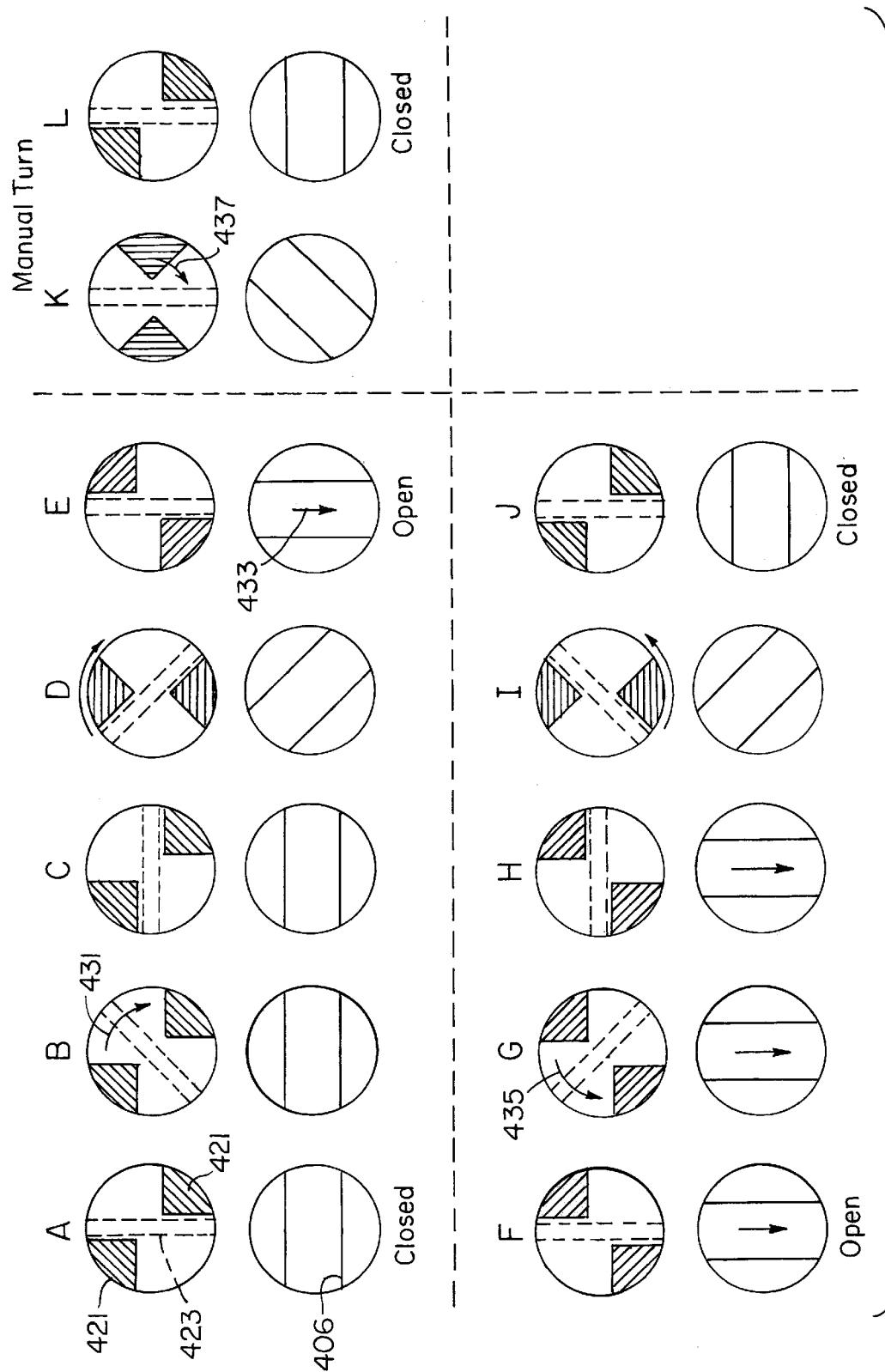
FIG. 10 is a diagram demonstrating the interaction between the drive disk and the valve core for the embodiment of FIGS. 7A and 7B.

FIG. 10 demonstrates this action more clearly. Steps A–E demonstrate the actuator-driven action from a closed valve position to an open position. Steps F–J demonstrate the opposite action from open to closed. Steps K and L demonstrate the action when the valve is manually closed using the hand knob. For each step, the top circle represents the drive disk bar 423 superimposed upon the actuator driven end of the valve core with valve core lobes 421. The bottom circle shown in each step depicts the orientation of the valve core hole 406 for that step.

For example, in step A, the valve core hole 406 is horizontally aligned so that the valve is closed. The drive disk bar 423 and valve core lobes 421 are in the positions shown. To open the valve, the actuator (not shown) turns the drive disk 180° in the direction shown by arrow 431 in step B. At step B, the actuator has rotated the drive disk 45°. The bar 423 has not yet contacted the lobes, so that the valve core does not turn. At step C, the drive disk has rotated 90° and begins to make contact with the lobes 421. As shown in step D, as the drive disk continues to turn, it pushes on the lobes and the valve core begins to turn. Finally in step E, the actuator has completed driving the drive disk 180°. The valve core has completed a 90° rotation into a vertical orientation and sample can flow through the valve core hole 406 as indicated by arrow 433.

Steps F–J reverse the process. The actuator drives the drive disk in the opposite direction as indicated by arrow 435.

Steps K and L demonstrate the action when the valve is manually closed using the hand knob. Assume an initial open position as in step E. The hand-controlled knob 419 is at the opposite end of the valve core 408 (FIG. 8B) so is not shown here. However turning it 90° so that travel continues in the same direction as in steps A–E, as shown by arrow 437 will cause the valve core to rotate through the intermediate position of step K to the closed position of step L, without requiring any action on the part of the actuator/drive disk. Note that in this final position L, the valve core is in exactly the same state as in step A and is therefore ready to be transferred to another station which can treat a sample run as if it were completely new. Note that other orientations of the lobes and opposite directions of travel are equally applicable.

In this embodiment, the device is less likely to be clogged by solids because it lacks the sharp turn and level area 303 in the water valve body 306 of the FIG. 6 embodiment. Also, because solvent washer tube 190 of FIG. 6 extends through to the bottle holder 300, that embodiment must be disassembled to clean out the clogging solids.

The embodiment of FIG. 7A is less prone to clogging because of the wide, straight passage 425 through which the sample flows from the bottle through the valve body/core, the collar 85, and over the filter (not shown). Because the bottle and cap adapter and filter form a tight seal, the filter can be placed on the bottle right-side up, no foil seal is needed, no barb is needed to pierce the foil, and the cannular solvent tube 403 is located only in the solvent ring 403, allowing easy disassembly.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An improved automatic filtration and extraction device comprising:
    a base defining a cavity area, said base further comprising a plurality of ports, each port having a respective flow controller for allowing or stopping flow of effluent through the respective port, said base having a bottom end;
    a filter positioned in the base above the ports;
    a collar positioned above the filter through which solvent or sample is passed to the filter, said collar having a top end;
    a level sensor contained in the collar;
    an electronic circuit electrically connected to the fluid level sensor for determining the level of fluid within a chamber in the collar, said circuit being connected to and controlling the port flow controllers according to the level of fluid within in the collar; and,
    a solvent dispenser fitting into the top end of the collar, said solvent dispenser introducing solvent throughout the collar.

2. The device of claim 1 wherein the port flow controllers are individually opened and closed by means of a vacuum, said vacuum being controlled by the electronic circuit.

3. The device of claim 2 further comprising:
    a removable sample collector adapted to the bottom end of the base.

4. The device of claim 2 wherein the electronic circuit further comprises a programmable memory, said electronic circuit being additionally connected to the solvent dispenser, said programmable memory allowing variable sequencing of control of the ports and solvent dispenser.

5. The device of claim 1, further comprising:
    a solvent ring adapted to said collar wherein various solvents are provided to said cavity area; and
    a sample providing means arranged above the filter comprising a valve assembly such that in a first orientation sample flows through the valve assembly onto said filter, and in a second orientation, sample is blocked, said valve assembly attaching to a sample container such that in the second orientation, the valve assembly and container can be removed as a single unit without loss of sample.

6. The device of claim 5 wherein the valve assembly further comprises a valve core, said valve core being controlled by an actuator which rotates 180°, and wherein the device further comprises a drive disk which converts 180° of rotation of the actuator into 90° of rotation of the valve core.

7. The device of claim 6 wherein the valve core comprises a hand-controllable knob for manually turning the valve core 90°.

8. The device of claim 7 wherein:
    the solvent ring further includes a flow channel disposed above the filter, defining a multiplicity of apertures therein; and
    the collar further includes a pre-wet channel which is aligned with the flow channel when the solvent ring is seated in the collar, such that solvent introduced into the flow channel is dispersed through the apertures.

9. The device of claim 7, the solvent further comprising:
    a solvent wash tube to spray solvent through the valve assembly into said sample container wherein the inside surface of said sample container can be washed down between samples.

* * * * *